US012347411B2

(12) United States Patent
Katoh et al.

(10) Patent No.: US 12,347,411 B2
(45) Date of Patent: Jul. 1, 2025

(54) ELECTRONIC KEYBOARD INSTRUMENT

(71) Applicant: CASIO COMPUTER CO., LTD., Tokyo (JP)

(72) Inventors: Hirokatsu Katoh, Kawasaki (JP); Hiroki Akai, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 291 days.

(21) Appl. No.: 18/189,317

(22) Filed: Mar. 24, 2023

(65) Prior Publication Data

US 2023/0306942 A1 Sep. 28, 2023

(30) Foreign Application Priority Data

Mar. 24, 2022 (JP) ................................ 2022-048496

(51) Int. Cl.
*G10H 1/34* (2006.01)

(52) U.S. Cl.
CPC .................................... *G10H 1/34* (2013.01)

(58) Field of Classification Search
CPC ...................................................... G10H 1/34
See application file for complete search history.

(56) References Cited

U.S. PATENT DOCUMENTS

2023/0306942 A1* 9/2023 Katoh ..................... H04R 9/06

FOREIGN PATENT DOCUMENTS

| | | | | |
|---|---|---|---|---|
| JP | H10260675 | A | | 9/1998 |
| JP | 2005202331 | A | | 7/2005 |
| JP | 2007003562 | A | * | 1/2007 |
| JP | 2007310320 | A | | 11/2007 |
| JP | 2009031812 | A | | 2/2009 |
| JP | 2010066065 | A | | 3/2010 |
| JP | 2020064147 | A | | 4/2020 |

OTHER PUBLICATIONS

Notice of Reasons for Refusal dated Feb. 6, 2024 received in Japanese patent Application No. JP 2022-048496.

* cited by examiner

*Primary Examiner* — Robert W Horn
(74) *Attorney, Agent, or Firm* — Scully, Scott, Murphy & Presser, P.C.

(57) ABSTRACT

An electronic keyboard instrument includes a keyboard provided on a player's side, a case including a back panel including a first sound radiation hole portion, an upper panel provided contiguously with the back panel, and a keyboard installation portion disposed in such a manner as to correspond to the keyboard, a speaker disposed in such a manner as to correspond to the first sound radiation hole portion, and a magnetic shielding member including a magnetic shielding material and disposed between the keyboard and the sound radiating section and fixed to the upper panel and the back panel in such a manner as to span the upper panel and the back panel.

20 Claims, 6 Drawing Sheets

ELECTRONIC KEYBOARD INSTRUMENT

CROSS-REFERENCE TO RELATED APPLICATION

This patent application is based upon and claims the benefit of priority under 35 USC 119 to Japanese Patent Application No. 2022-048496 filed on Mar. 24, 2022, the entire disclosure of which, including the specification, claims, drawings and abstract, is incorporated herein by reference in its entirety.

BACKGROUND OF THE INVENTION

Technical Field

The present disclosure relates to an electronic keyboard instrument.

DESCRIPTION OF THE RELATED ART

There have conventionally been disclosed electronic keyboard instruments which can produce a key press-down feeling almost equivalent to the one a real piano produces as a result of including hammer members and counterweights. These hammer members and the like are sometimes formed from an iron-based material.

Further, in such conventional electronic keyboard instruments, a case can be made small in size because a speaker and hammer members of keys can be provided close to each other.

SUMMARY OF THE INVENTION

According to an aspect of the present disclosure, there is provided an electronic keyboard instrument including a keyboard provided on a player's side thereof, a case including a back panel including a first sound radiation hole portion, an upper panel provided contiguously with the back panel, and a keyboard installation portion disposed in such a manner as to correspond to the keyboard, a sound radiating section disposed in such a manner as to correspond to the first sound radiation hole portion, and a magnetic shielding member including a magnetic shielding material and disposed between the keyboard and the sound radiating section and fixed to the upper panel and the back panel in such a manner as to span the upper panel and the back panel.

DESCRIPTION OF THE EMBODIMENT

Figure 1:
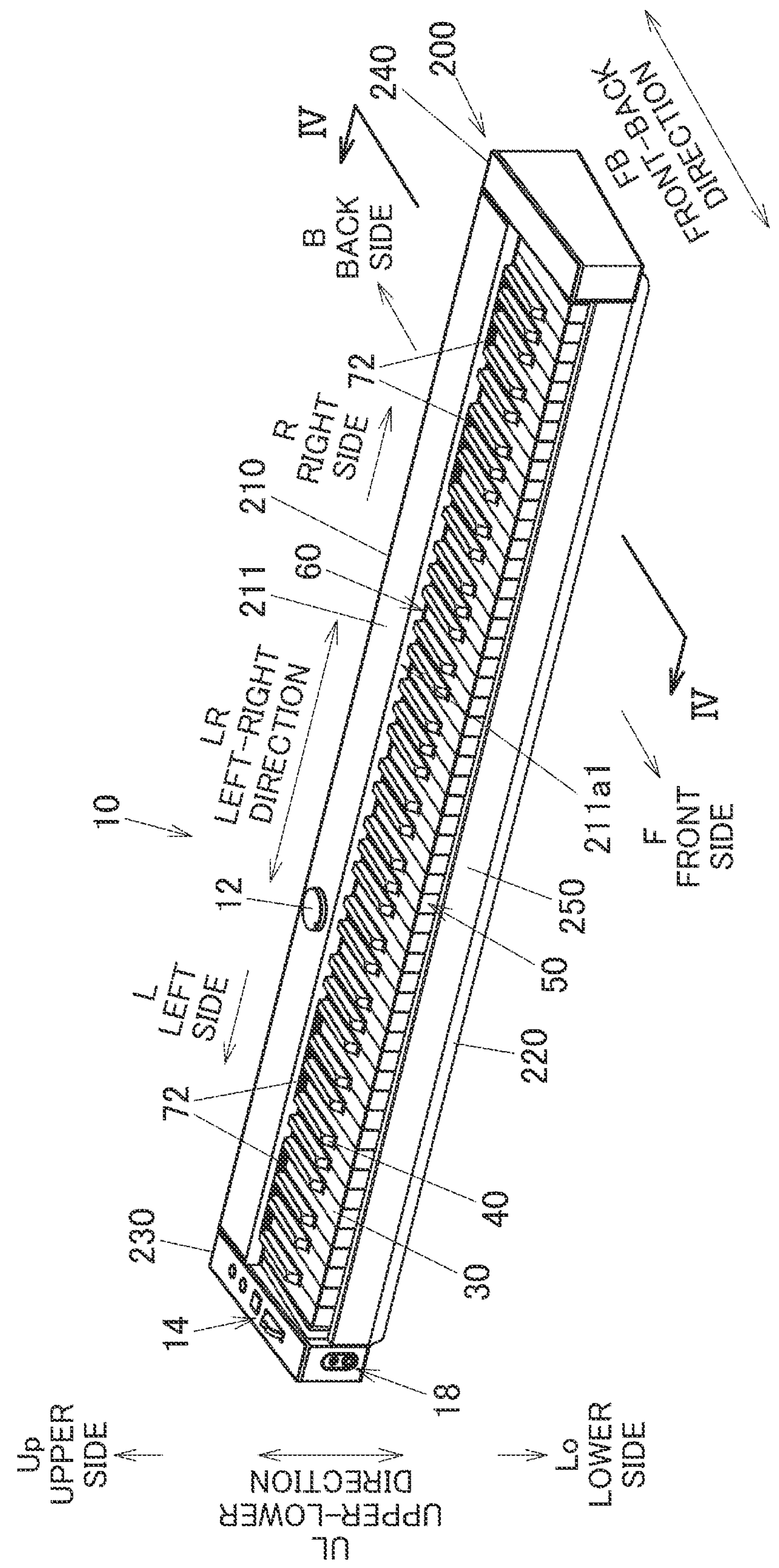
FIG. 1 is a perspective view of an electronic keyboard instrument according to an embodiment of the present disclosure as viewed from a front side thereof.

Hereinafter, an embodiment of the present disclosure will be described based on drawings. An electronic keyboard instrument 10 shown in FIG. 1 includes a full-scale (88-note) keyboard 50 including plural white keys 30 and plural black keys 40, which make up a large number of keys or 88 keys of the keyboard 50, and a case 200. The keyboard 50 is provided at a player's side (a front side) of the electronic keyboard instrument 10. In the following description, a front to the keys in the keyboard 50 in a front-back direction FB is referred to as a front side F, and a back to the keys in the keyboard 50 in the front-back direction FB is referred to as a back side B. When facing the keyboard 50 from a front side F thereof, a left of the keyboard 50 is referred to as a left side L, and a right of the keyboard 50 is referred to as a right side R. In the keyboard 50, the keys are aligned in a left-right direction LR. When viewing the electronic keyboard instrument 10 in an upper-lower direction UL thereof, an upper side is referred to as an upper side Up, and a lower side is referred to as a lower side Lo.

Figure 2:
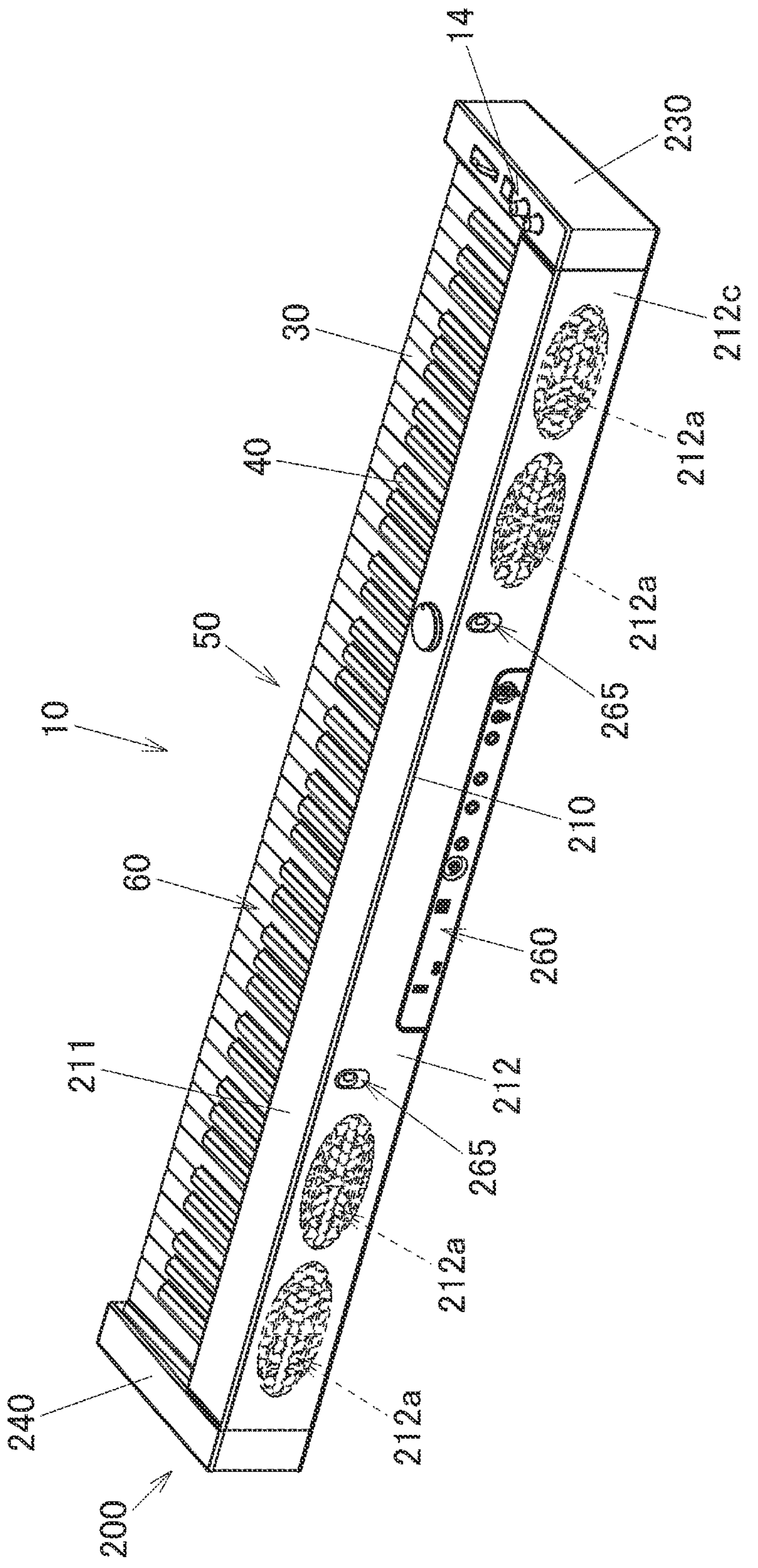
FIG. 2 is a perspective view of the electronic keyboard instrument according to the embodiment of the present disclosure as viewed from a back side thereof.

As shown in FIGS. 1 and 2, the case 200 has an upper case 210, a lower case 220, a left side case 230 and a right side case 240 which constitute side cases, and a front case 250. The upper case 210 has an upper panel 211 and a back panel 212 and has substantially an L-shape (refer to FIG. 4) as viewed in a vertical section. The upper case 210 is formed in such a manner as to be long in the left-right direction LR. The left side case 230 and the right side case 240, which each have substantially a rectangular shape elongated in the front-back direction FB, are disposed at left and right end portions of the upper case 210 and the front case 250, respectively. The lower case 220 is provided on lower sides Lo of the upper case 210 and the side cases (the left side case 230, the right side case 240).

A space defined at a front side F of the upper case 210 and between the left side case 230 and the right side case 240 is made into a keyboard installation portion 60 which is disposed in such a manner as to correspond in place to the keyboard 50 for installation of the keyboard 50. The front case 250, having substantially a plate-like shape elongated in the left-right direction LR, is provided at a front side F of the keyboard 50 and between the left side case 230 and the right side case 240.

A rotary knob 12, which is configured to control the volume of the electronic keyboard instrument 10, is provided on the upper panel 211 of the upper case 210. A control section 14, which includes a pitch modulator, push buttons, and the like, is provided on an upper surface of the left side case 230. In addition, an earphone jack 18 is provided in a front surface of the left side case 230. Additionally, as shown in FIG. 2, a plug panel 260, to which various types of plugs are connected, is provided at a central lower portion of a back side of the electronic keyboard instrument 10. Stay insertion holes 265 are provided on an upper side Up and left and right sides L, R of the plug panel 260 so as to allow a music stand to be set upright from the electronic keyboard instrument 10 in front of the player.

Figures 3A, 3B, 3C:
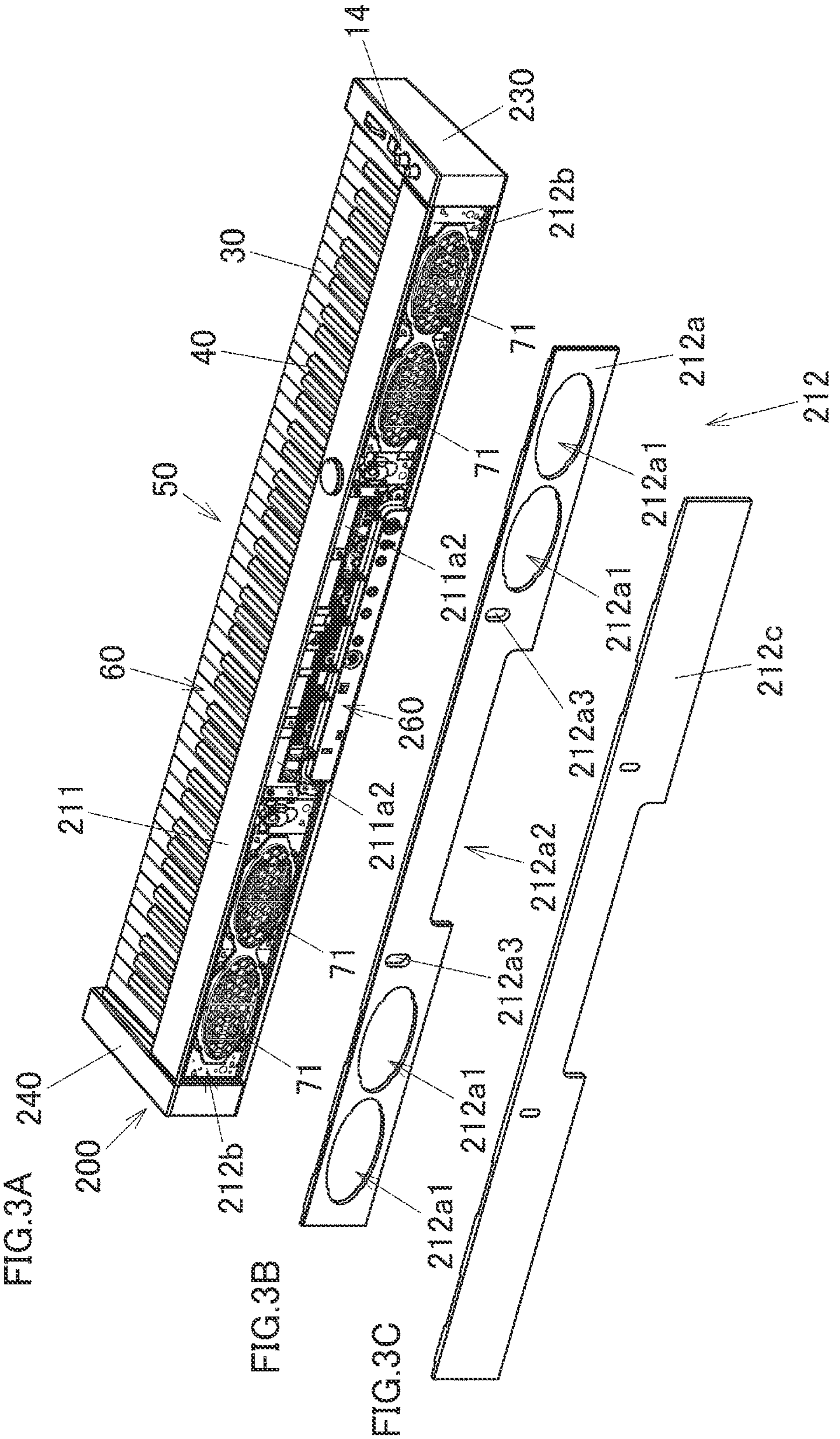
FIGS. 3A to 3C are perspective views of the electronic keyboard instrument according to the embodiment of the present disclosure as viewed from the back side thereof, with a back panel disassembled from the electronic keyboard instrument.

As shown in FIG. 3A, a frame member 212*a* and back panel main bodies 212*b*, which are disposed laterally separately, are provided on the back panel 212 of the upper case 210. The back panel main bodies 212*b* are each formed substantially into a rectangular plate-like shape which is long in the left-right direction LR and individually have two first sound radiation hole portions 71. Thus, the two first sound radiation hole portions 71 are provided at each of a left side L and a right side R of the plug panel 260 in such a manner as to hold the plug panel 260 therebetween. The first sound radiation hole portions 71 has plural holes which are arranged substantially into a honeycomb configuration. The frame member 212*a* is formed substantially into a single piece of plate which is long in the left-right direction LR. The frame member 212*a* includes elliptic opening portions 212*a*1 provided in such a manner that major axes thereof are directed to follow the left-right direction LR so as expose the corresponding first sound radiation hole portions 71, a cut-out portion 212*a*2 provided so as to expose the plug panel 260 and opening portions 212*a*3 provided so as to expose the corresponding stay insertion holes 265. In addition, a saran net 212*c* is provided so as to cover the frame member 212*a*.

Figure 4:
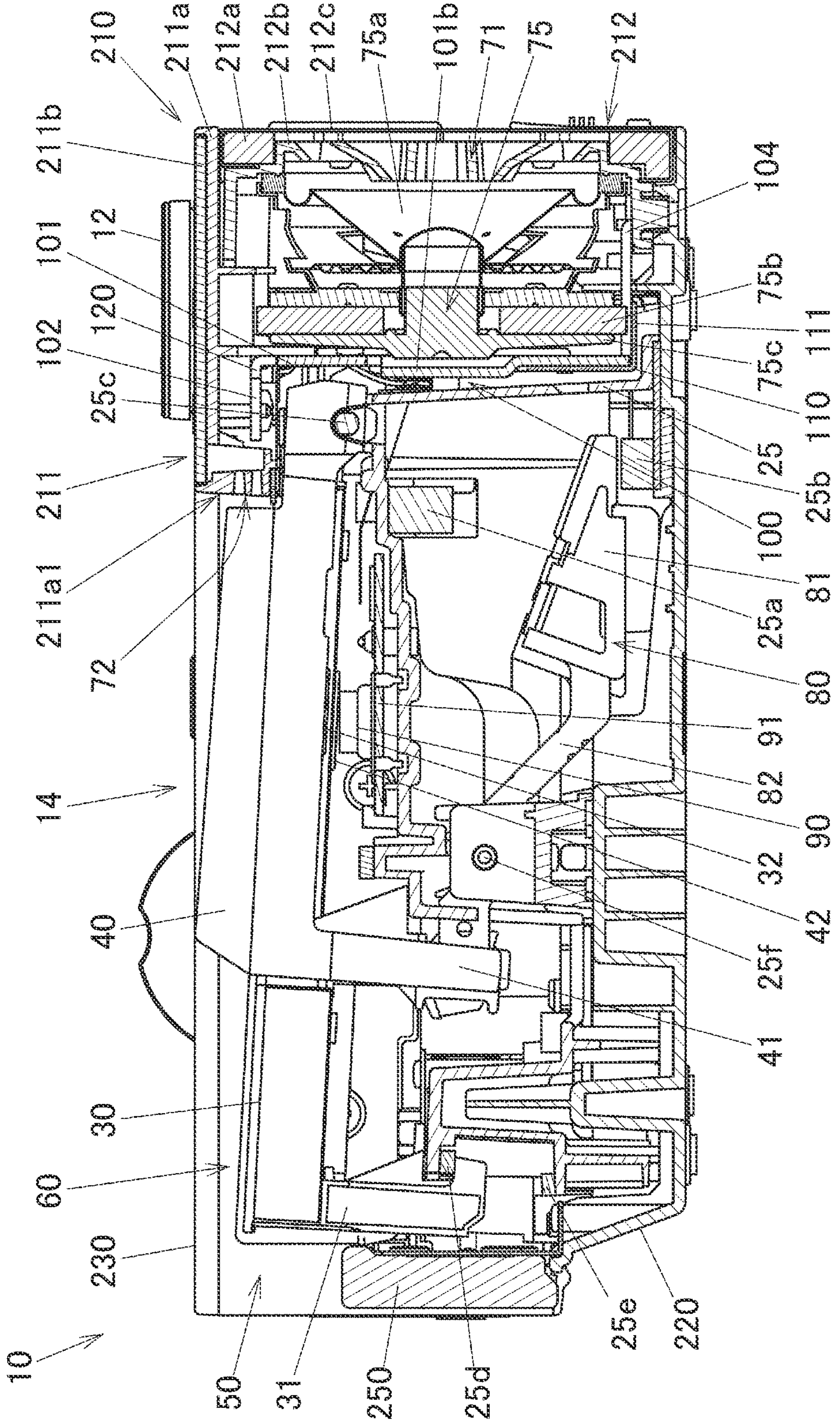
FIG. 4 is a sectional view of the electronic keyboard instrument according to the embodiment of the present disclosure taken along a line IV-IV in FIG. 1.
Figure 6:
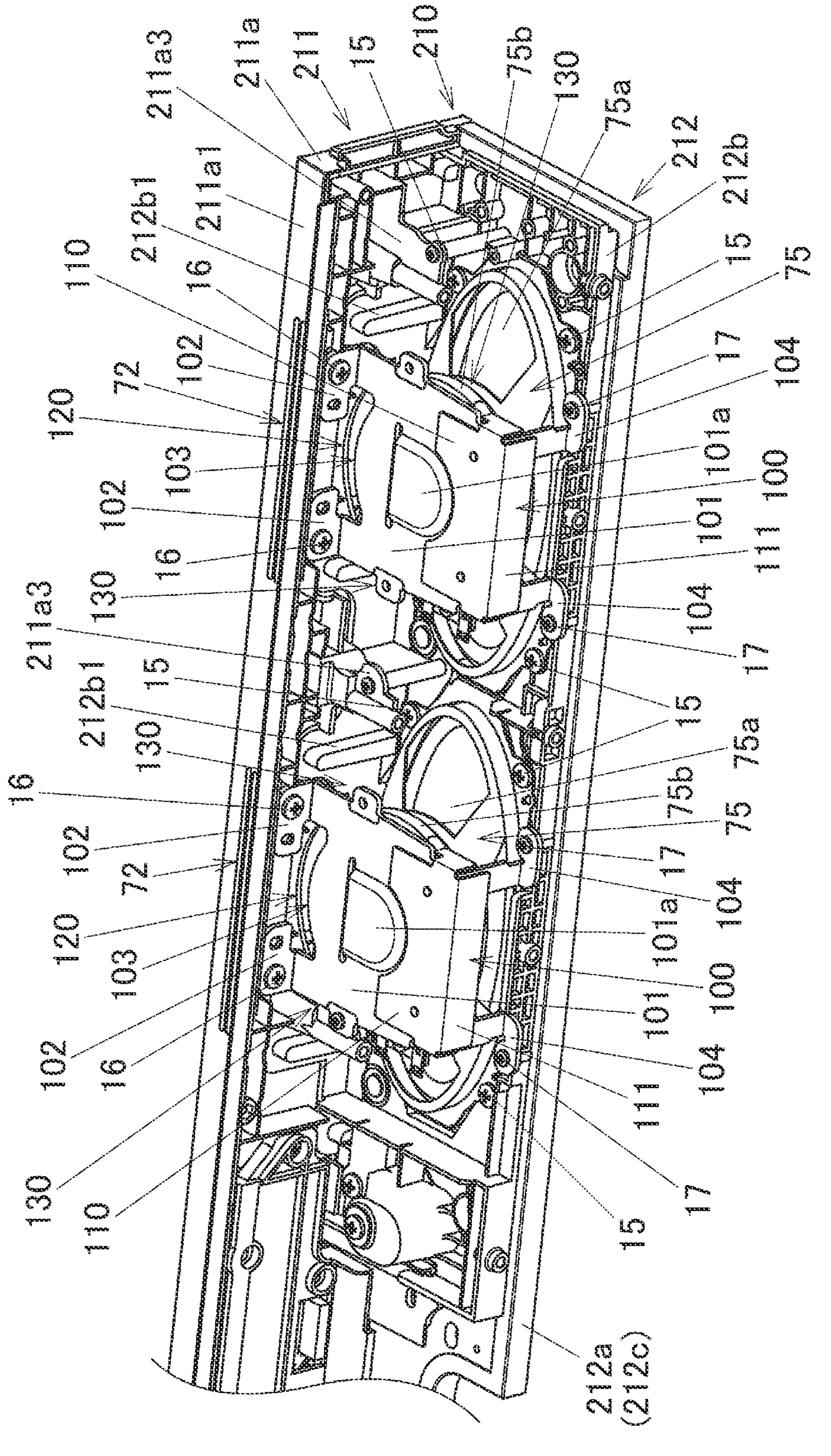
FIG. 6 is an enlarged perspective view of the main part of the upper side case portion of the electronic keyboard instrument according to the embodiment of the present disclosure.

The upper panel 211 of the upper case 210 has, as shown in FIG. 4, an upper panel main body 211*a* and an upper panel member 211*b*. The upper panel main body 211*a* has a perpendicular wall portion 211*a*1, which is provided by causing a front end portion of the upper panel main body 211*a* to fall or extend perpendicularly down to the vicinity of a back end, that is, a back side B of the keyboard 50. Second sound radiation hole portions 72 are provided in the perpendicular wall portion 211*a*1. As shown in FIG. 1, four second sound radiation hole portions 72 are provided in total, that is, two at two locations on the left side L and two at two locations on the right side R. These second sound radiation hole portions 72 are configured to radiate sound forwards towards the keyboard 50 and upwards directly above the keys of the keyboard 50. In addition, as shown in FIG. 3A, a back wall portion 211*a*2 is provided substantially at a central portion defined between the left and right back panel main bodies 212*b* in such a manner as to extend perpendicularly downwards along a back surface of the upper panel main body 211*a* at a back side B of the upper panel main body 211*a*. As shown in FIG. 6, plural attachment plates 211*a*3 are provided in such a manner as to extend perpendicularly downwards from the upper panel main body 211*a*, and plural attachment plates 212*b*1 are provided in such a manner as to extend forwards from each of the back side panel main bodies 212*b*. The back panel main bodies 212*b* and the upper panel main body 211*a* are fixed to the attachment plates 211*a*, 212*b* with plural screw members. In this way, the upper panel 211 is provided contiguously with the back panel 212.

As shown in FIG. 4, an inner case 25 is provided inside the case 200. The white keys 30 and the black keys 40 are supported rotatably at back end portions thereof by corresponding rotational fulcrum portions 25*c* which are provided in the inner case 25 (in FIG. 4, a rotational fulcrum portion 25*c* is shown which supports the black key 40 rotatably). A hook-shaped restriction portion 31 is provided on the white key 30 in such a manner as to extend from a distal end portion of the relevant white key 30 towards the lower side Lo, whereby an upper limit position and a lower limit position of the white key 30 are defined by an upper cushion 25*d* and a lower cushion 25*e*, respectively, which are provided at a front side F of the inner case 25.

Plural hammer members 80 are provided inside the inner case 25 in such a manner as to be connected with the corresponding white keys 30 and the corresponding black keys 40. The hammer member 80 includes a substantially triangular weight portion 81 and an arm portion 82 which extends from the weight portion 81 to the front side F. The arm portion 81 is pivotally supported by a rotational fulcrum portion 25*f* inside the inner case 25. A distal end portion of the arm portion 82 is connected with a hammer pressing portion provided on the white key 30 and the black key 40 (in FIG. 4, a hammer pressing portion 41 for the black key 40 is shown).

When the white key 30 or the black key 40 is pressed down, the weight portion 81 of the hammer member 80 is raised so as to cause the player to feel a sensation of heaviness when he or she presses down the white key 30 or the black key 40. This allows the player to experience a key press-down feeling like a key press-down feeling that the player feels when he or she plays a real piano. Inside the inner case 25, cushion members 25*a*, 25*b* are provided above and below the weight portion 81, respectively, whereby the cushion members 25*a*, 25*b* come into abutment with the weight portion 81 at an upper limit position and a lower limit position of the weight portion 81, respectively.

A substrate 91 is provided on an upper surface of the inner case 25, and a switch 90 is provided on the substrate 91. Switches 90 are provided in such a manner to correspond individually to the white keys 30 and the black keys 40. When the white key 30 or the black key 40 is depressed, the switch 90 corresponding thereto is pressed by a switch pressing portion 32 or 42 to thereby sound a note in a musical scale that corresponds to the white key 30 or the black key 40 so depressed down.

Here, the keyboard 50 includes the white keys 30 and the black keys 40, the inner case 25, and the hammer members 80 which are mounted and supported inside the inner case 25 in such a manner as to operate together with the white keys 30 and the black keys 40 when they are depressed down.

Figure 5:
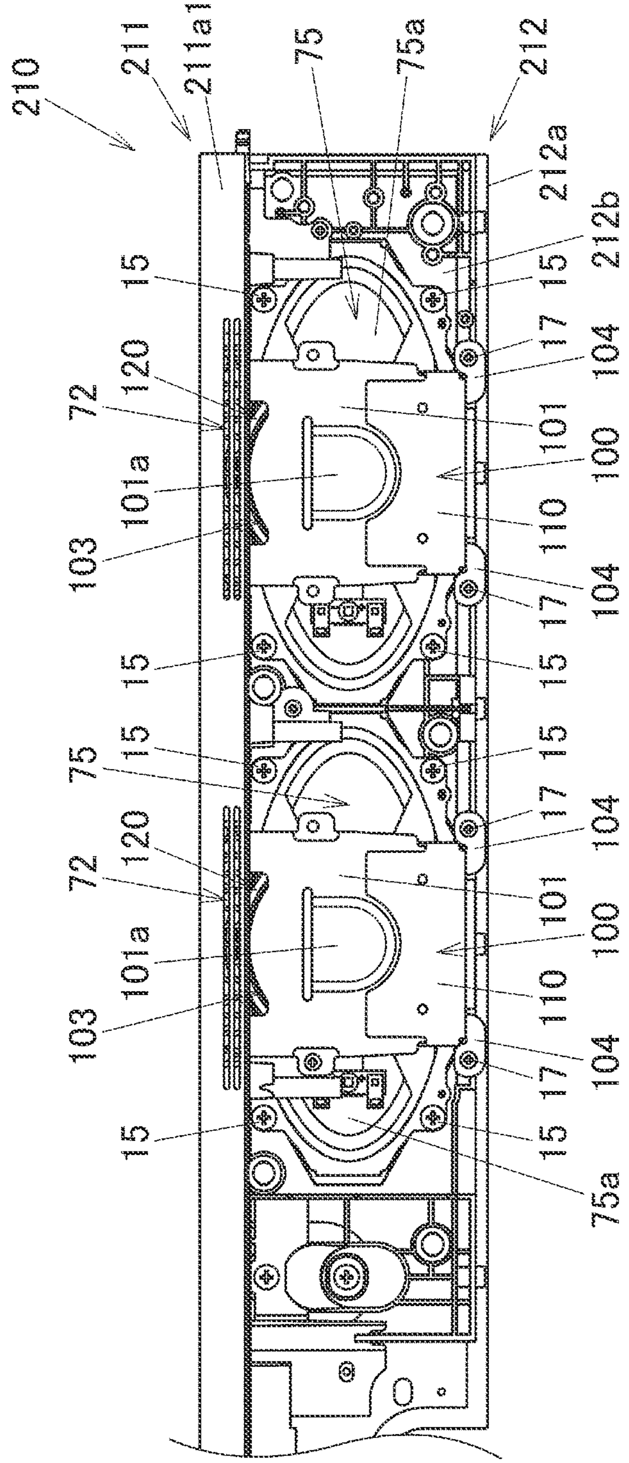
FIG. 5 is an enlarged front view of a main part of an upper side case portion of the electronic keyboard instrument according to the embodiment of the present disclosure.

As shown in FIGS. 4 to 6, speakers 75, which function as sound radiators or radiating sections (sound radiation apparatuses), are provided in the back side panel main bodies 212*b* of the back panel 212 in such a manner as to correspond to the first sound radiation hole portions 71. The speakers 75 are fixed individually to inner sides of the back panel main bodies 212*b* (front side F surfaces of the back panel main bodies 212*b*) with machine screws 15 with respective cones 75*a* thereof directed towards the corresponding first sound radiation hole portions 71.

A magnetic shielding member 100 is provided at a front side F of the speaker 75 and the back side B of the keyboard 50 (in other words, between the speaker 75 and the keyboard 50) inside the case 200. The magnetic shielding member 100 is formed from a sheet of steel, which is a magnetic shielding material, through sheet metal work. As shown in FIGS. 4 and 5, the magnetic shielding member 100 is disposed in such a manner that plate surfaces of a plate-shaped main body portion 101, which constitutes a plate-shaped main body part, of the magnetic shielding member 100 are made to face the front-back direction FB. A protruding portion 101*a*, which protrudes to the front side F, is provided substantially at a central portion of the plate-shaped main body portion 101 in such a manner as to match the shape of a central portion of the speaker 75.

The magnetic shielding member 100 has two upper attachment portions 102 and two lower attachment portions 104. The two upper attachment portions 102 extend upwards from an upper side Up of the plate-shaped main body portion 101 into a bifurcating configuration and are then bent towards the front side F, whereby the upper attachment portions 102 are provided substantially parallel to the upper panel 211. A screw hole is provided in each of the upper attachment portions 102, whereby the attachment portions 102 are fixed to the upper panel main body 211*a* of the upper panel 211 with machine screws 16. A portion of an upper side Up of the plate-shaped main body portion 101 defined between the two upper attachment portions 102 is formed into a convexly arcing edge portion 103 so as to match convexly arcing external shapes of a magnet 75*b* and a yoke 75*c* of the speaker 75.

The two lower attachment portions 104 are bent at right angles into a bifurcating configuration from a lower side Lo of the plate-shaped main body portion 101 to extend to the back side B and are bent again in such a manner that plate surfaces thereof are made to face the front-back direction FB. A screw hole portion is provided in the plate surfaces, which are made to face the front-back direction FB, of each of the lower attachment portions 104, whereby the lower attachment portions 104 are fixed to the back panel main bodies 212*b* of the back panel 212 with machine screws 17. As a result, the magnetic shielding member 100 is fixed to the upper panel 211 and the back panel 212 of the upper case 210 in such a manner as to span the upper panel 211 and the back panel 212, thereby not only supporting in an approaching direction a movement of the upper panel 211 and the back panel 212, which are provided in such a manner as to intersect substantially at right angles, but also reinforcing the upper panel 211 and the back panel 212.

A lower cover 110, which constitutes a separate member, is provided so as to cover substantially a half portion on the lower side Lo of the plate-shaped main body portion 101 of the magnetic shielding member 100. Similarly, the lower cover 110 is also formed from a sheet of steel, which constitutes a magnetic shielding material, through sheet metal work. A non-opening portion 111 is provided on the lower cover 110 by bending a lower end of the lower cover 110 to the back side B at right angles, whereby the non-opening portion 111 is caused to cover as far as a portion lying directly below the magnet 75*b*.

By providing the lower cover 110 as the separate member, a portion near to the hammer member 80 is covered double by the plate-shaped main body portion 101 and the lower cover 110 in a thickness direction, thereby improving the magnetic shielding effect. In the present embodiment, while the magnetic shielding member 100 is described as being made up of the plate-shaped main body portion 101 and the lower cover 110 which are provided separately, the plate-shaped main body portion 101 and the lower cover 110 may be formed integrally.

In this way, the magnetic shielding member 100 is provided so as to cover the magnet 75*b* of the speaker 75. Here, a portion on an upper side Up of the convexly arcing edge portion 103 at the upper side Up of the plate-shaped main body portion 101 is made into an opening portion 120 through which an upper side of the magnet 75*b* is visible. Additionally, a left side and a right side of the plate-shaped main body portion 101 are opened so as to be made into open portions 130.

Sound from the speaker 75 is radiated to the back side B of the electronic keyboard instrument 10 via the first sound radiation hole portions 71, and part of the sound is radiated from the opening portion 120 to the front side F. The sound from the opening portion 120 is radiated to the player's side (the front side) via the second sound radiation hole portions 72. In addition, by providing the open portions 130, a risk is reduced of occurrence of an echo of sound between a back surface of the speaker 75 and the magnetic shielding member 100.

Thus, according to the embodiment of the present disclosure, the electronic keyboard instrument 10 includes the keyboard 50 provided on the player's side of the electronic keyboard instrument 10, the case 200 including the back panel 212 including the first sound radiation hole portions 71, the upper panel 211 provided contiguously with the back panel, and the keyboard installation portion 60 disposed in such a manner as to correspond to the keyboard 50, the speakers 75 which constitute the sound radiating sections disposed in such a manner as to correspond to the first sound radiation hole portions 71, and the magnetic shielding members 100 including a magnetic shielding material and disposed between the keyboard 50 and the speaker 75 with the plate surfaces of the plate-shaped main body portion 101 made to face in the front-back direction FB, and fixed to the upper panel 211 and the back panel 212 in such a manner as to span the upper panel 211 and the back panel 212.

As a result, even though the case 200 is provided small in size by disposing the speakers 75 and the keyboard 50 in such a manner as to lie close to each other, since the upper panel 211 and the back panel 212 are supported to be reinforced, while reducing the influence of the magnets 75*b* provided in the speakers 75 on the relevant iron-based members such as the hammer members 80 and the counterweights, vibrating or beating noise can be reduced which would otherwise be produced from the upper panel 211 and the back panel 212. As a result, the quality of sound can be enhanced while reducing the size of the electronic keyboard instrument 10.

In addition, the upper panel 211 includes the second sound radiation hole portions 72 configured to radiate sound to the player's side, and the magnetic shielding members 100 each have the opening portion 120 which corresponds to the second sound radiation hole portions 72. As a result, the second sound radiation hole portions 72, configured to facilitate the hearing of sound by the player, are provided separately from the first sound radiation hole portions 71 configured to radiate sound towards the audience. These second sound radiation hole portions 72 are configured to radiate sound via the opening portions 120 in the magnetic shielding members 100, whereby the player can clearly hear sound he or she is making by playing the electronic keyboard instrument 10.

In the present embodiment, the second sound radiation hole portions 72 are provided in the perpendicular wall portion 211*a*1 which lies directly above the back side B of the keyboard 50. However, the second sound radiation hole portions 72 can also be provided in other locations on the upper panel 211 so as to radiate sound towards the player. That is, the second sound radiation hole portions 72 can also be provided in such a manner as to be directed to the player's side (towards the keyboard 50) which is an obliquely upward front side or the like.

In addition, the second sound radiation hole portions 72 are configured to radiate sound towards the keyboard 50. As a result, the second sound radiation hole portions 72 can be provided in the perpendicular wall portion 211*a*1 which is located at an inconspicuous portion, thereby making it possible to enhance the design of the electronic keyboard instrument 10.

The opening portions 120 are each formed into the arcing shape, thereby making it possible to let sound out into the corresponding second sound radiation hole portions 72 while shielding well the annular magnets 75*b*.

The open portions 130 are provided in the magnetic shielding member 100 in the left-right direction LR. As a result, a risk can be reduced of the magnetic shielding member 100 influencing the acoustics of the speaker compartment.

The keyboard 50 includes the hammer members 80. With these magnetic shielding members 100, the upper panel 211 and the back panel 212 can be held together so as to be reinforced while reducing a risk of the magnets 75*b* of the speakers 75 influencing the operations of the hammer members 80.

The magnetic shielding members 100 each include the non-opening portion 111 provided at the lower side thereof. As a result, an influence of a magnetic force of the magnet 75*b* of the speaker 75 applied from the lower side of the magnetic shielding member 100 can be reduced.

In the present embodiment, the magnetic shielding member 100 is described as being provided in such a manner as to be fixed to the upper panel 211 and the back panel 212 on which the sound radiating sections 75 are disposed in such a manner as to span the upper panel 211 and the back panel 212. However, a configuration may be adopted in which the magnetic shielding member 100 is fixed to the upper panel 211 and the left side case 230 or the right side case 240 on which the sound radiating section 75 is disposed in such a manner as to span the upper panel and the back panel. Alternatively, a configuration may be adopted in which the magnetic shielding member 100 is fixed to the lower case 220 and the back panel 212 on which the sound radiating sections 75 are disposed in such a manner as to span the upper panel and the back panel.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. An electronic keyboard instrument comprising:
- a keyboard provided on a player's side;
- a case comprising a back panel comprising a first sound radiation hole portion, an upper panel provided contiguously with the back panel, and a keyboard installation portion disposed in such a manner as to correspond to the keyboard;
- a sound radiating section disposed in such a manner as to correspond to the first sound radiation hole portion; and
- a magnetic shielding member including a magnetic shielding material and disposed between the keyboard and the sound radiating section and fixed to the upper panel and the back panel in such a manner as to span the upper panel and the back panel.

2. The electronic keyboard instrument according to claim 1,
- wherein the upper panel comprises a second sound radiation hole portion configured to radiate sound to the player's side, and
- wherein the magnetic shielding member comprises an opening portion which corresponds to the second sound radiation hole portion.

3. The electronic keyboard instrument according to claim 2,
- wherein the second sound radiation hole portion is configured to radiate sound towards the keyboard.

4. The electronic keyboard instrument according to claim 2,
- wherein the opening portion is provided into an arcing shape.

5. The electronic keyboard instrument according to claim 1,
- wherein the magnetic shielding member comprises an opening portion provided in such a manner as to face a left-right direction.

6. The electronic keyboard instrument according to claim 1,
- wherein the keyboard comprises a hammer member.

7. The electronic keyboard instrument according to claim 1,
- wherein the upper panel comprises an upper panel main body and an upper panel member,
- wherein the upper panel main body comprises a perpendicular wall portion which is provided in such a manner that a front end portion thereof extends downwards to a position lying near to a back side of the keyboard, and
- wherein a second sound radiation hole portion is provided in the perpendicular wall portion.

8. The electronic keyboard instrument according to claim 7,
- wherein the back panel comprises a frame member and back panel main bodies which are disposed individually leftward and rightward, the frame member and the back panel main bodies being provided on the back panel, and
- wherein the upper panel main body comprises at a back side thereof a back wall portion which is provided substantially at a central portion defined between the left and right back panel main bodies in such a manner as to extend downwards perpendicularly along a back surface thereof.

9. The electronic keyboard instrument according to claim 8,
- wherein plural first attachment plates are provided in such a manner as to extend downwards perpendicularly from the upper panel main body,
- wherein plural second attachment plates are provided in such a manner as to extend from the back panel, and
- wherein the back panel and the upper panel main body are fixed to the first attachment plates and the second attachment plates with plural screw members.

10. The electronic keyboard instrument according to claim 1,
- wherein the magnetic shielding member comprises a plate-shaped main body portion, two upper attachment portions, and two lower attachment portions.

11. The electronic keyboard instrument according to claim 10,
- wherein the upper attachment portions extend from an upper side of the plate-shaped main body portion in such a manner as to bifurcate and are then bent to a front side so as to be substantially parallel to the upper panel,
- wherein a screw hole is provided in each of the upper attachment portions, so that the upper attachment portions are fixed to the upper panel main body, and
- wherein a convexly arcing edge portion is formed between the two upper attachment portions.

12. The electronic keyboard instrument according to claim 10,
- wherein the lower attachment portions are bent at right angles from a lower side of the plate-shaped main body portion in such a manner as to bifurcate to extend to the back side and are then bent again in such a manner that plate surfaces thereof are made to face in a front-back direction, and wherein a screw hole portion is provided in each of the lower attachment portions in the plate surfaces thereof which are made to face the front-back direction, so that the lower attachment portions are fixed to the back panel main body.

13. The electronic keyboard instrument according to claim 10, wherein the magnetic shielding member comprises a lower cover provided on a lower side of the plate-shaped main body portion.

14. The electronic keyboard instrument according to claim 1, wherein the magnetic shielding member comprises a non-opening portion provided at a lower side thereof.

15. The electronic keyboard instrument according to claim 1, wherein a speaker functioning as the sound radiating section is provided on the back panel in such a manner as to correspond to the first sound radiation hole portion.

16. The electronic keyboard instrument according to claim 15, wherein the speaker comprises a cone, a magnet, and a yoke, the magnet and the yoke each having a convexly arcing shape as an external shape thereof.

17. The electronic keyboard instrument according to claim 10, wherein a speaker functioning as the sound radiating section is provided on the back panel in such a manner as to correspond to the first sound radiation hole portion, and wherein the speaker comprises a cone, a magnet, and a yoke, the magnet and the yoke each having a convexly arcing shape as an external shape thereof.

18. The electronic keyboard instrument according to claim 16, wherein the magnetic shielding member comprises a lower cover provided thereon, and wherein the lower cover comprises a non-opening portion provided thereon in such a manner that a lower end is bent at right angles towards the back side so as to cover as far as a portion lying directly below the magnet.

19. The electronic keyboard instrument according to claim 17, wherein the upper panel comprises a second sound radiation hole portion configured to radiate sound towards a player's side, wherein the magnetic shielding member is provided in such a manner as to cover the magnet, wherein an opening portion is provided above the magnet in such a manner as to correspond to the second sound radiation hole portion, and wherein left and right side surfaces of the plate-shaped main body portion are opened so as to be individually made into an opening portion configured not to cover the magnet.

20. The electronic keyboard instrument according to claim 2, wherein sound from the sound radiating section is radiated to the back side of the electronic keyboard instrument via the first sound radiation hole portion, while a part of the sound is radiated to a front side from the opening portions.

* * * * *